(12) United States Patent
Croissant

(10) Patent No.: US 9,855,521 B2
(45) Date of Patent: Jan. 2, 2018

(54) FILTER ELEMENT, FILTER ARRANGEMENT AND METHOD FOR PRODUCING THE FILTER ELEMENT

(71) Applicant: MANN+HUMMEL GMBH, Ludwigsburg (DE)

(72) Inventor: Horst Croissant, Hochstadt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/193,116

(22) Filed: Feb. 28, 2014

(65) Prior Publication Data

US 2014/0174047 A1 Jun. 26, 2014

Related U.S. Application Data

(63) Continuation of application No. PCT/EP2012/066415, filed on Aug. 23, 2012.

(30) Foreign Application Priority Data

Aug. 29, 2011 (DE) .................. 10 2011 111 378

(51) Int. Cl.
*B01D 46/00* (2006.01)
*B01D 35/00* (2006.01)
*B01D 46/52* (2006.01)
*F02M 35/024* (2006.01)

(52) U.S. Cl.
CPC ......... *B01D 35/005* (2013.01); *B01D 46/527* (2013.01); *F02M 35/02408* (2013.01); *F02M 35/02416* (2013.01); *B01D 2201/304* (2013.01); *B01D 2201/342* (2013.01); *B01D 2271/022* (2013.01); *Y10T 156/10* (2015.01)

(58) Field of Classification Search
CPC ....... F02M 35/02408; F02M 35/02416; F02M 35/024; B01D 35/005; B01D 35/00; B01D 46/527; B01D 46/00; B01D 46/40–46/406; B01D 46/2422; B01D 46/2425; B01D 46/528; B01D 46/2444; B01D 2201/34–2201/347; B01D 2201/304
USPC ....... 55/490–519, 385.3; 210/497.01; 156/60
See application file for complete search history.

(56) References Cited

U.S. PATENT DOCUMENTS

| 5,484,466 | A | 1/1996 | Brown et al. |
| 5,498,660 | A * | 3/1996 | Takahashi ............ C08K 5/5419 524/730 |
| 6,168,647 | B1 * | 1/2001 | Perry, Jr. ................ B01D 45/02 55/319 |
| 2007/0175187 | A1 * | 8/2007 | Kopec et al. ................ 55/385.3 |
| 2010/0043366 | A1 * | 2/2010 | Boehrs .................... B01D 46/10 55/480 |

(Continued)

FOREIGN PATENT DOCUMENTS

| DE | 19910821 A1 | 6/2000 |
| DE | 10257543 A1 | 6/2004 |
| DE | 102004031609 A1 | 2/2006 |

*Primary Examiner* — T. Bennett McKenzie
(74) *Attorney, Agent, or Firm* — James Hasselbeck

(57) ABSTRACT

A filter element includes a filter body (2) and a monolithic seal (10) arranged to extend circumferentially about the filter body. The seal (10) has a sealing body (14) and a sealing lip (16) which is connected at a first sealing lip section (15) with the sealing body (14) and that is spaced apart from the seating body (14) at a second sealing lip section (17).

11 Claims, 2 Drawing Sheets

(56) References Cited

U.S. PATENT DOCUMENTS

2010/0126129 A1* 5/2010 Kim .................... A47L 9/122
                                                        55/494
2011/0041692 A1* 2/2011 Raether ..................... 95/280

* cited by examiner

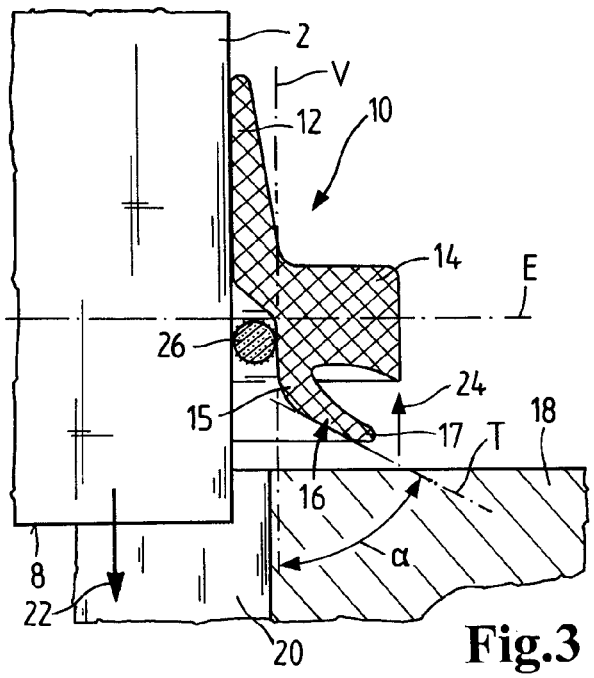
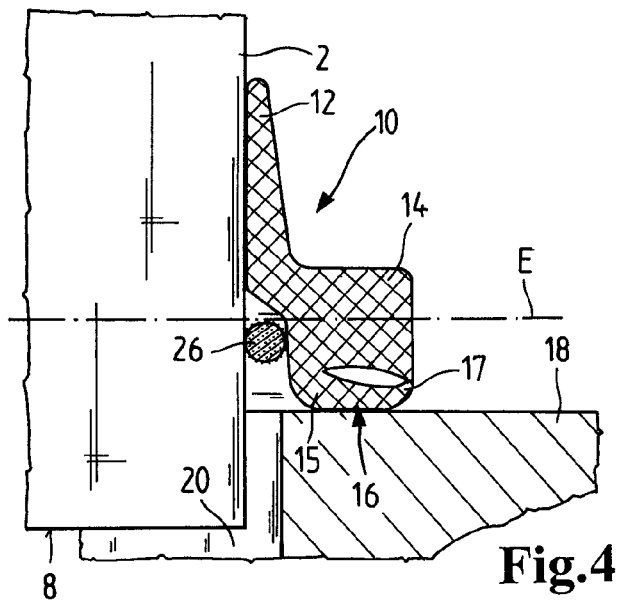
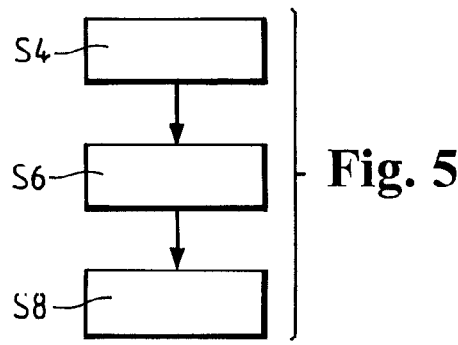

FILTER ELEMENT, FILTER ARRANGEMENT AND METHOD FOR PRODUCING THE FILTER ELEMENT

CROSS-REFERENCE TO RELATED APPLICATIONS

This application is a bypass continuation application of international application No. PCT/EP2012/066415 having an international filing date of Aug. 23, 2012 and designating the United States, the international application claiming a priority date of Aug. 29, 2011, based on prior filed German patent application No. 10 2011 111 378.2, the entire contents of the aforesaid international application and the aforesaid German patent application being incorporated herein by reference.

TECHNICAL FIELD

The invention concerns a filter element for a motor vehicle and a filter arrangement that comprises the filter element. Moreover, the invention concerns a method for producing the filter element.

In a motor vehicle, a filter element is used for filtering various fluids. The fluids may be liquid or gaseous fluids, for example, air, oil, fuel, exhaust gas or other operating media of the motor vehicle. For filtering the fluid, such a filter element has a filter body comprised of filter material. The filter material is, for example, a pleated nonwoven filter material. The filter body can have several passages and/or can be rolled up or wound. When used as intended, the filter element is arranged in a filter housing or a filter receptacle. The seal prevents that the fluid to be filtered can flow unfiltered past the filter body through the filter housing or the filter receptacle.

BACKGROUND

It is known to foam a seal onto an outer circumference of the filter body. The filter body with the seal can be arranged with press fit in an appropriate filter housing. The sealing action is then realized in radial direction in that the seal is compressed between filter body and filter housing in radial direction.

SUMMARY OF THE INVENTION

It is the object of the present invention to provide an improved possibility of arranging a filter body seal-tightly in a filter housing.

The invention concerns a filter element, in particular for a motor vehicle. The filter element comprises a filter body and a seal. The seal is designed monolithically, i.e., manufactured as one piece or embodied as a single component, and is arranged so as to extend circumferentially about the filter body. The seal has a sealing body and a sealing lip. The sealing lip has a first sealing lip section that is connected with the sealing body and a second sealing lip section that is spaced apart from the sealing body. In other words, the sealing lip and the sealing body define an angle that is greater than zero. The angle is preferably an acute angle and is open in outward direction.

As a result of the monolithic configuration and the sealing lip, a particularly advantageous sealing action can be achieved by means of the seal in a simple way.

In one embodiment, the seal is arranged parallel to a plane, in particular to a cross-sectional plane of the filter body. A sealing action by means of the seal is realized perpendicular to this plane. This may also be referred to as an axial sealing action that is acting along a longitudinal axis of the filter body. The filter body is, for example, cylinder-shaped. As a result of the sealing action perpendicular to the plane, the filter element and a filter arrangement with the filter element are less sensitive with regard to manufacturing tolerances of individual components. Moreover, the perpendicular sealing action enables designing a filter receptacle, for example, in a filter housing, to be so small that it can receive only a portion of the filter body where no seal is arranged.

In one embodiment the seal is pre-manufactured. This means that first the seal is produced and that the finish-produced seal is arranged circumferentially about the filter body. This contributes to a simple and inexpensive manufacture of the filter element. The pre-manufactured seal can be referred to also as an externally produced seal or a pre-manufactured seal.

According to one embodiment, the seal is extrusion-molded and can be produced in particular as continuous material. This enables pre-manufacture of the seal in a particularly simple way.

According to one embodiment, the sealing lip is designed such that its second sealing lip section, upon pressure application on the sealing lip, is moving perpendicularly to the plane toward the sealing body. This enables a sealing action in the direction perpendicular to the plane in a simple way.

According to one embodiment, the sealing lip is positioned relative to a perpendicular onto the plane at a predetermined angle that is greater than zero. The second sealing lip section is positioned relative to the filter body farther in outward direction than the first sealing lip section. This makes it possible that, upon pressure application onto the sealing lip perpendicular to the plane, the second sealing lip section moves toward the sealing body.

According to one embodiment, a coupling area is connected with the sealing body. The coupling area is designed so as to be connectable seal-tightly with the filter body. In other words, the coupling area serves as a connecting member between sealing body and filter body. This can contribute to a good sealing action of the filter body.

In one embodiment, the filter body comprises filter material, for example nonwoven filter material or a filter medium of cellulose. The filter body can be produced, for example, by pleating the filter material. The filter body can also be formed by alternatingly stacked filter material layers wherein the first layer is a flat layer and the second layer is a corrugated layer and between the layers filter passages are formed. The filter passages can be alternatingly open at one of their axial ends and closed at the other axial end so that the fluid to be filtered enters at a first side of the filter body at an open end of one of the passages, penetrates the filter material toward another one of the passages, and then exits through it from the filter body at a second side of the filter element.

In one embodiment, the filter body comprises a filter material that is wound up to a roll and comprises a flat layer and a corrugated layer. The filter body can be designed cylindrically, in particular of a circular cylinder shape, wherein the passages extend in axial direction. The cylinder shape makes it possible to design the filter body in a compact configuration while having a high filtering action. Alternatively, several semi-finished products formed of a flat layer and a corrugated layer can be stacked in order to form the filter body.

In one embodiment, the seal is manufactured as a single piece, i.e., monolithic and thus formed of a single component, and is arranged so as to surround circumferentially a circumference of the filter body in a plane parallel to a plane that is in particular positioned parallel to an inflow and/or outflow surface of the filter body and/or perpendicular to the flow-through direction of the filter body. A longitudinal axis of the filter body is preferably parallel to the passages that are formed between the flat layer and the corrugated layer and thus in particular parallel to the flow-through direction.

The seal has in one embodiment a coupling area, a sealing body, and a sealing lip. The coupling area is preferably resting seal-tightly on the filter body and serves in particular for coupling the seal on the filter body. It is preferably monolithically joined to the sealing body. As an alternative to providing the coupling area, it is possible to connect the sealing body directly to the filter body. On a side of the filter body which is opposite the coupling area, the filter body is preferably connected to the sealing lip.

In one embodiment, between the sealing body and the filter body an adhesive is applied in particular for seal-tight and strong connection between filter body and seal. The sealing lip has preferably a first sealing lip section and a second sealing lip section wherein, at the first sealing lip section, the sealing lip is monolithically connected with the sealing body and, at the second sealing lip section, the sealing lip is spaced apart from the sealing body, in particular in the direction of flow or the longitudinal axis.

In one embodiment, the sealing lip and the sealing body define an angle relative to each other that is greater than zero, is acute, and is open in outward direction, i.e., pointing away from the filter body in radial direction. By pressure application on the sealing lip in a pressure direction parallel to the longitudinal axis of the filter body, the sealing lip can thus move perpendicular to the plane E in the direction toward the sealing body and in particular can contact it. In this way, in particular a sealing action in axial direction, i.e., along the longitudinal axis and perpendicular to a plane that is parallel to an inflow or outflow surface, can be achieved.

According to a second aspect, the invention concerns a filter arrangement, for example, for the intake air for the internal combustion engine of a motor vehicle. The filter arrangement comprises a filter element and a filter housing that has a recess. The filter housing with its recess can also be referred to as filter receptacle. In the recess, the filter element in particular the filter body, is arranged at least partially.

In a preferred embodiment, the seal is arranged outside of the recess. Preferably, a rim of the recess pushes the second sealing lip section in the direction perpendicular to the plane toward the sealing body. The sealing action is thus outside of the recess and perpendicular to the plane so that the filter arrangement is insensitive relative to manufacturing tolerances of the individual modules of the filter arrangement.

The filter body is preferably arranged partially in the recess. The filter body can particularly be inserted still farther into the recess along an insertion direction.

In one embodiment, the seal seals in the mounted position the filter body in the filter housing so that no fluid can flow past the filter body between filter body and filter housing. In this position, a rim of the recess pushes the second sealing lip section toward the sealing body in the direction perpendicular to the plane that is in particular parallel to the outflow surface or perpendicular to the longitudinal axis. The sealing action is realized thus in the direction perpendicular to this plane, i.e., in axial direction.

In a further embodiment, a diameter of the recess is reduced such that only the filter body, for example, with clearance fit, can fit into the recess but no longer the seal or a conventional seal providing a sealing action in radial direction and arranged radially between the wall of the recess and the filter body. Accordingly, only the filter element in which the sealing action is realized perpendicular to the aforementioned plane, i.e., in axial direction, can be arranged in the filter receptacle. In this way, an excellent and reliable sealing action is achieved.

The invention concerns according to a third aspect a method for producing the filter element. In this context, the seal is designed monolithically with the seal body and with the sealing lip such that the first sealing lip section is connected with the sealing body and the second sealing lip section is spaced from the sealing body. Subsequently, the seal is arranged on the filter body about a circumference of the filter body and, for example, is glued onto the circumference.

Further configurations of the invention are the subject matter of the dependent claims as well as of the embodiments disclosed in the following. In the following, the invention will be explained in more detail with the aid of embodiments with reference to the attached Figures.

BRIEF DESCRIPTION OF THE DRAWINGS

It is shown in:

FIG. 3: a detail view of the filter element in a first position;
FIG. 4: a detail view of the filter element in a second position;
FIG. 5: a diagram of a method for producing the filter element.

In the Figures, same or functionally the same elements, inasmuch as nothing to the contrary is indicated, are identified with the same reference characters.

DETAILED DESCRIPTION

Figure 1:
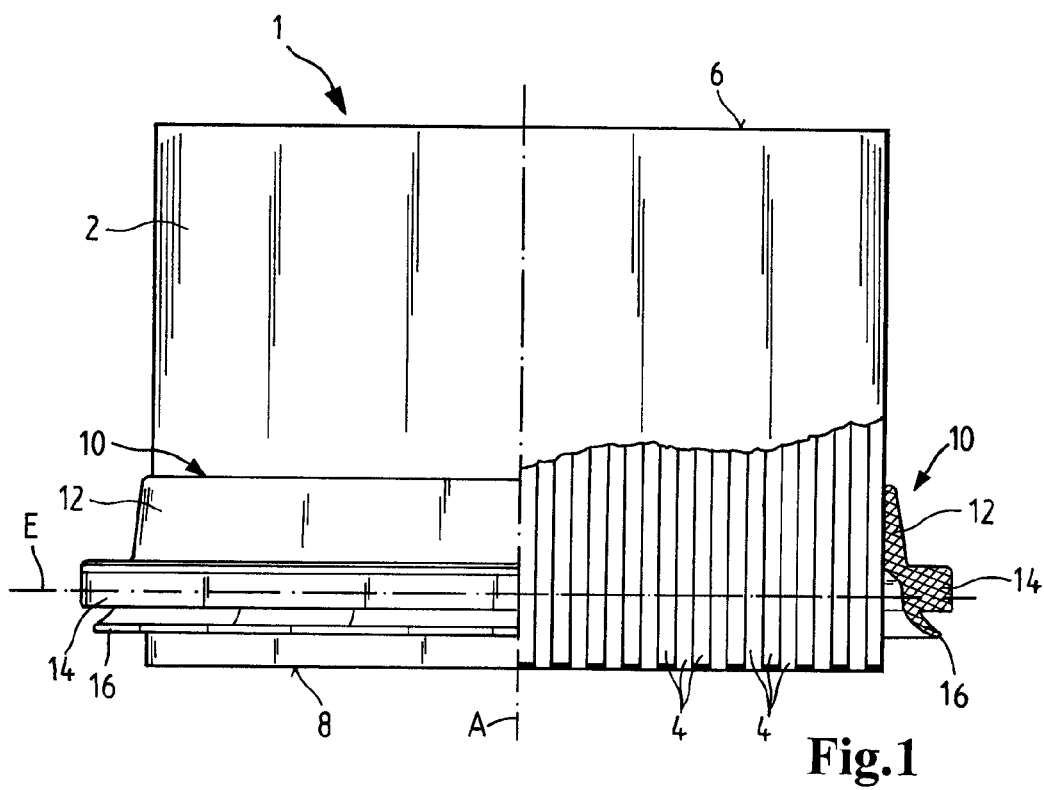
FIG. 1: a partially sectioned side view of a filter element.

FIG. 1 shows a partially sectioned side view of a filter element 1. The filter element 1 comprises a filter body 2 and a seal 10. The filter body 2 comprises filter material, for example, pleated nonwoven filter material, in which filter passages 4 are formed. The filter passages 4 are alternatingly open at one of their axial ends and closed off at the other axial end so that the fluid to be filtered enters at an open end of one of the passages 4 at a first side 6 of the filter body 2, penetrates the filter material in the direction to another one of the passages 4, and exits from the filter body 2 at a second side 8 of the filter element 1 through said one of the other passages 4. The filter element 1 is suitable for filtering fluids, in particular operating media of a motor vehicle. The operating media encompass, for example, oil, fuel, air or exhaust gas.

The seal 10 is formed as unitary, one-piece, monolithic component manufactured in a one-piece configuration, and thus as a single component, and is arranged about a circumference of the filter body 2 circumferentially extending parallel to a plane E. In particular, a plane in which the seal 10 is positioned is oriented parallel to the plane E. The seal 10 has a coupling area 12, a sealing body 14, and a sealing lip 16. The coupling area 12 is positioned seal-tightly directly on the radial outer surface of the filter body 2 and is monolithically bonded with the sealing body 14. As an alternative to providing the coupling area 12, the sealing body 14 can also be connected directly with the filter body 2. On a side of the sealing body 14 which is opposite the coupling area 12, the sealing body is connected with the sealing lip 16.

Figure 2:
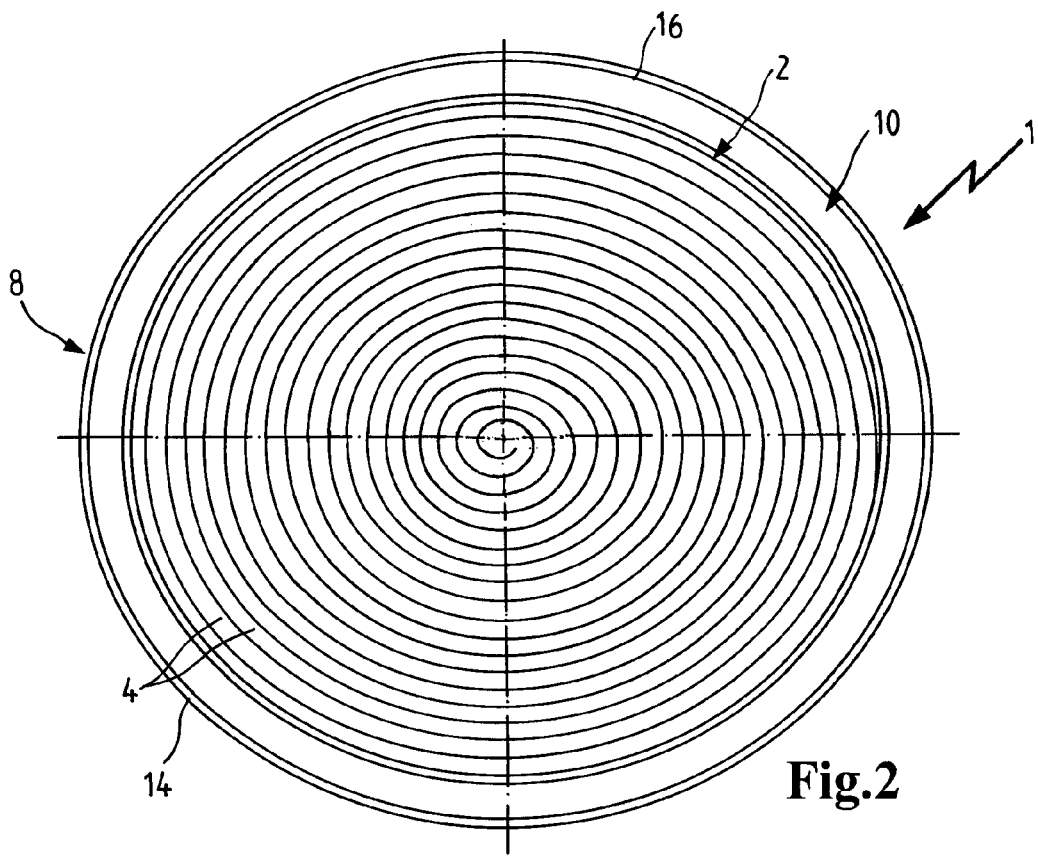
FIG. 2: a bottom view of the filter element.

FIG. 2 shows a bottom view of the filter element 1 which illustrates that the filter body 2 comprises a filter material that is wound to a roll. The filter body 2 is cylindrical wherein the passages 4 extend in axial direction. The cylindrical shape enables designing the filter body 2 in a compact configuration with a high filtering action. The longitudinal axis A of the cylinder-shaped filter body 2 is positioned perpendicular to the plane E. The axis extends thus parallel to a perpendicular line on the plane E (see FIG. 1).

FIG. 3 shows a detail view of the filter element 1 and in particular of the seal 10 in a first position. In the first position, the filter body 2 is arranged at least partially in a filter housing 18 wherein the position for the intended use has not yet been reached. Between the sealing body 14 and the filter body 2 an adhesive 26 is provided. The sealing lip 16 has a first sealing lip section 15 and a second sealing lip section 17. At the first sealing lip section 15 the sealing lip 16 is monolithically bonded with the sealing member 14. At the second sealing lip section 17 the sealing lip 16 is spaced apart from the sealing body 14, namely in the direction perpendicular to the plane E.

The sealing lip 16, in particular a tangent T at the sealing lip 16, is positioned at an angle α relative to a perpendicular V that is perpendicular to the plane E. Relative to the filter body 2, the second sealing lip section 17 is arranged farther outwardly than the first sealing lip section 15. In other words, the sealing lip 16 and the sealing body 14 are positioned at an angle relative to each other that is greater than zero, is acute, and is open in outward direction. This has the effect that, when pressure is applied onto the sealing lip 16 in the pressure direction 24, the sealing lip 16 moves perpendicular to the plane E in the direction toward the sealing body 14. In this way, a sealing action in axial direction, i.e., along the longitudinal axis and perpendicular to the plane E is achieved.

A filter housing 18 has a recess 20. The filter body 2 is partially arranged in the recess 20. The filter body 2 can be inserted along an insertion direction 22 even father into the recess 20. The filter housing 18 with its recess 20 can also be referred to as a filter receptacle.

FIG. 4 shows a detail view of the filter element 1 and of the filter housing 18 wherein the filter body 2 is in a second position that corresponds to the position for intended use of the filter element 1. In the second position, the seal 10 seals the filter body 2 in the filter housing 18 so that no fluid can pass the filter body between filter body 2 and filter housing 18. In the second position, a rim of the recess 20 forces the second sealing lip section 17 in the direction perpendicular to the plane E toward the sealing body 14. The sealing action is realized thus in the direction perpendicular to the plane E, i.e., in axial direction.

A diameter of the recess 20 can be reduced such that only the filter body 2, for example, with clearance fit, fits into the recess 20 but no longer the seal 10 or a conventional seal where the sealing action is realized in radial direction and that is arranged radially between a wall of the recess 20 and the filter body 20. In this way, only the filter element 1 in which the sealing action is realized perpendicular to the plane E, i.e., in axial direction, can be arranged in the filter receptacle. Accordingly, a good sealing action is achieved.

FIG. 5 shows a diagram of a method for producing the filter arrangement in which steps S4 to S8 are processed sequentially. In the step S4, the seal 10 is pre-manufactured and produced monolithically independent of the filter body 2. In particular, the seal 10 is not foamed about the filter body 2 and has no multi-component structure, for example, two rings. The seal 10 can be pressed, cast or injection-molded by means of a mold. For example, the seal 10 can be extrusion-molded as continuous material. Individual sections are then cut to a suitable length.

In the step S6, the seal 10 is attached to the filter body 2. Preferably, the seal 10 is glued onto the circumference of the filter body 2. For this purpose, it is not necessary to employ adhesive wedges. As an adhesive, an adhesive agent 26 is used, for example. As an alternative or in addition, the seal 10 can be bonded in the coupling area 12 with the filter body 2. After completion of the step S6, the filter element 1 is completed. Preferably, an existing adhesive layer between the coupling area 12 and the filter body 2 is of uniform thickness. The adhesive can be applied particularly thin.

In a step S8, the finished filter element 1 can be arranged partially in the recess 20 so that the seal 10 is arranged outside of the recess 20 and the rim of the recess 20 presses the second sealing lip section 17 perpendicularly to the plane E toward the sealing body 14.

As an alternative to the illustrated embodiments, the filter body 2 can also have an oval or angular cross-section. Moreover, the filter body 2 can be enclosed by a housing and the seal 10 can be applied to the circumference of the housing. Moreover, the filter material can also be folded. Moreover, the filter element 1 can also be used outside of the motor vehicle for filtering the various fluids.

Even though the present invention has been described presently with the aid of preferred embodiments, it is not limited thereto but can be modified in multiple ways.

The invention claimed is:

1. A filter element for a motor vehicle or a compressor, comprising
   an axially elongated filter body of a filter medium having an axis of symmetry parallel to a flow through direction, the filter body having axially opposing first and second ends relative to the axis of symmetry; and
   a monolithic seal, in an installed or uninstalled state of the filter element, arranged proximate to the second end and secured directly onto a radially outer surface of the filter medium of the filter body, the monolithic seal extending circumferentially around the filter body;
   wherein the monolithic seal includes
       an annular coupling member, the annular coupling member adhesively bonded directly onto and extending axially directly on the radially outer surface of the filter medium of the filter body;
       a sealing body spaced axially from and connected to the annular coupling member, the sealing body arranged to extend circumferentially around the radially outer surface of the filter body, the sealing body spaced radially outwardly away from the radially outer surface of the filter body;
       a sealing lip having
           a first sealing lip section connected to the sealing body at a first end of the sealing lip; and
           a second sealing lip section at a second end of the sealing lip, the second sealing lip section connected to the first sealing lip section, in the uninstalled state the second sealing lip section projecting axially away from the sealing body towards the second end of the filter body such that the sealing lip from the first sealing lip section to the second sealing lip section projects radially outwardly at an acute angle relative to the axis of symmetry, in the installed state and uninstalled state, the second sealing lip section spaced radially outwardly away from the radially outer surface of the filter body;

wherein an area of the sealing body opposite the sealing lip and adjacent to the annular coupling member is exposed in the uninstalled state of the filter element;

wherein the sealing body protrudes from the annular coupling member;

wherein in the installed state, the second sealing lip section moves to reduce a gap between the second sealing lip section and the sealing body;

wherein the monolithic seal is formed of a single component and has no multi-component structure.

2. The filter element according to claim 1, wherein the seal, in the installed or the uninstalled state includes a coupling area connected with the sealing body and that is designed so as to be connected seal-tightly with the filter body.

3. The filter element according to claim 1, wherein the sealing body being spaced radially outwardly away from the radially outer surface of the filter body forms an open annular gap between the radially outer surface of the filter body and the sealing body, the open annular gap opening towards the second end of the filter body.

4. The filter element according to claim 1, wherein the monolithic seal is pre-manufactured in one piece as a component, and later secured directly onto the radially outer surface of the filter body.

5. The filter element according to claim 4, wherein the monolithic seal is extrusion-molded.

6. The filter element according to claim 1, wherein the filter body defines a radially extending first plane arranged perpendicularly to the axis of symmetry of the filter body;

the seal is arranged parallel to the first plane and in the uninstalled or the installed state, the second sealing lip section arranged parallel to the first plane, such that the sealing action by means of the seal is realized perpendicular to the first plane.

7. The filter element according to claim 6, wherein the sealing lip is embodied such that in the installed state the second sealing lip section upon pressure application onto the sealing lip moves perpendicular to the first plane toward the sealing body.

8. The filter element according to claim 7, wherein the sealing lip, in the uninstalled state, extends in a direction defining a predetermined angle greater than zero relative to a line perpendicular to the first plane; and wherein in the uninstalled state, the second sealing lip section relative to the filter body is arranged farther radially outwardly than the first sealing lip section.

9. A filter arrangement for a motor vehicle, comprising the filter element according to claim 6;

a filter housing that has a recess in which at least partially the filter body is arranged;

wherein the seal is arranged outside of the recess; and wherein in the installed state, a rim of the recess presses the second sealing lip section perpendicular to the first plane toward the sealing body.

10. A method for producing the filter element, comprising: forming a monolithic seal for an axially elongated filter body, the monolithic seal having a sealing body configured to extend circumferentially around the radially outer surface of the filter body, the sealing body sized to be spaced radially outwardly away from the radially outer surface of the sealing body;

wherein the monolithic seal includes an annular coupling member, the annular coupling member arranged on and secured directly on the radially outer surface of the filter body;

a sealing body spaced axially from and connected to the annular coupling member, the sealing body arranged to extend circumferentially around the radially outer surface of the filter body, the sealing body spaced radially outwardly away from the radially outer surface of the filter body;

a sealing lip having a first sealing lip section connected to the sealing body at a first end of the sealing lip; and a second sealing lip section at a second end of the sealing lip, the second sealing lips section connected to the first sealing lip section, the second sealing lip section projecting axially away from the sealing body towards the second end of the filter body such that the sealing lip from the first sealing lip section to the second sealing lip section projects radially outwardly at an acute angle relative to the axis of symmetry, the second sealing lip section spaced radially outwardly away from the radially outer surface of the filter body;

arranging the monolithic seal directly on the radially outer surface of the filter body so as to circumferentially extend about the filter body such that in an installed state of the filter element, the second sealing lip section moves to reduce a gap between the second sealing lip section and the sealing body;

wherein an area of the sealing body opposite the sealing lip and adjacent to the annular coupling member is exposed in an uninstalled state of the filter element;

wherein the sealing body protrudes from the annular coupling member.

11. The method of claim 10, wherein in the forming step, the seal is formed in one piece, monolithically and separate from the filter body, wherein the seal is not foamed about the filter body and has no multi-component structure;

wherein in the arranging step, the method further comprises:

adhesively securing the seal directly onto the filter body.

* * * * *